March 18, 1930.   C. I. HALL   1,751,328
RELAY CIRCUITS
Filed July 6, 1923
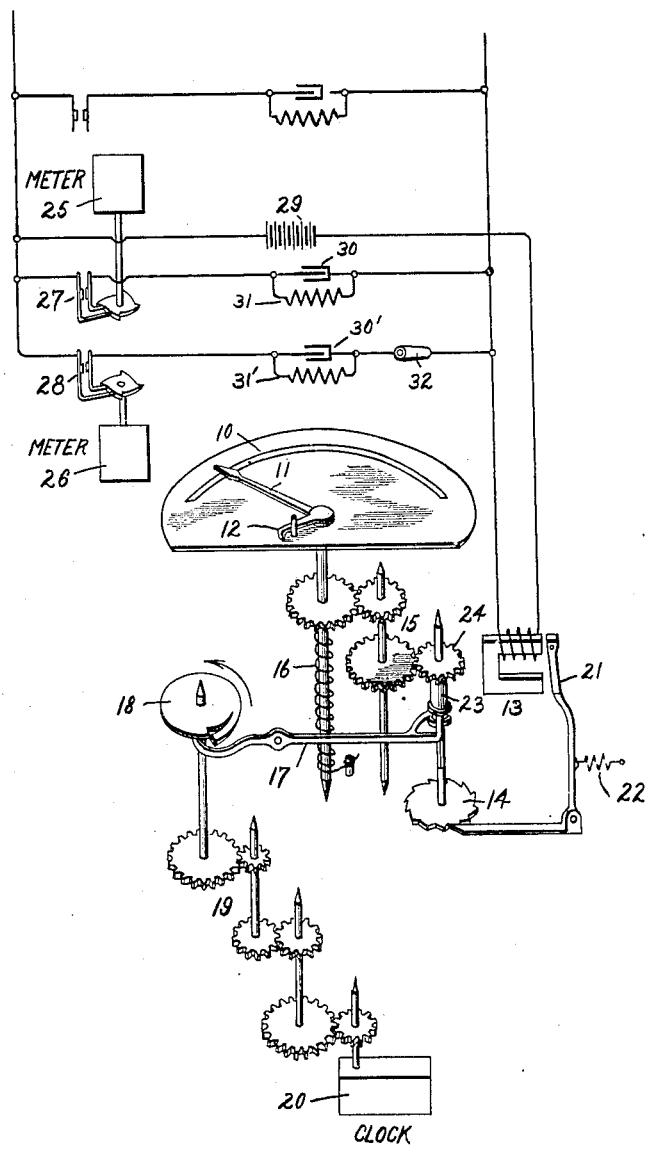
Inventor:
Chester I. Hall,
by
His Attorney.

Patented Mar. 18, 1930

1,751,328

UNITED STATES PATENT OFFICE

CHESTER I. HALL, OF FORT WAYNE, INDIANA, ASSIGNOR TO GENERAL ELECTRIC COMPANY, A CORPORATION OF NEW YORK

RELAY CIRCUITS

Application filed July 6, 1923. Serial No. 649,787.

My invention relates to the energizing circuit for translating devices such for example as electric relays, signals and the like and in particular to the energizing circuit of a demand meter relay. The main object of my invention is to improve the operation and operating conditions of demand meter relays, particularly where the demand registration of two or more meters is recorded by a single relay. Another object of my invention is to prevent the waste of energy in the operation of relays generally. Other advantages of my invention will appear as the description proceeds.

The features of my invention which I believe to be novel and patentable will be pointed out in the claims appended hereto. A practical application of my invention will now be explained in connection with the accompanying drawings which represent the use of my invention in connection with a duplex demand meter provided with a single operating relay.

Referring to the drawing, I have represented in the lower portion of the figure a well known type of demand meter. This meter comprises a dial 10, a friction pointer 11, a periodically reset dog 12 for advancing the friction pointer in accordance with the demand to be indicated, a notching-up relay 13 and a ratchet 14 for advancing the dog through a train of gears 15, a spring 16 for returning the dog to a zero position, a lever 17 for disconnecting the driving connection between the ratchet and dog and a cam 18 driven through a train of gears 19 from a timing device 20 for operating lever 17 at predetermined time intervals. Thus, when the relay 13 is energized, for example, by the closing of meter operated contacts, its armature 21 is drawn in and advances the ratchet 14 one notch. This advances the dog 12 and winds up spring 16. When the relay 13 is deenergized, armature 21 is withdrawn by retracting spring 22 and the operation is repeated upon the next closure of the meter operated contacts. Dog 12 moves pointer 11 up the scale until the clock driven cam 18 presses down the left hand end of lever 17 at which time its right hand end slides the splined sleeve 23 and with it gear 24 up out of mesh with the gear train 15. Spring 16 now returns dog 12 to a zero position against a stop while the friction pointer 11 remains in the position to which it has been moved by the greatest advance of the dog in any time interval. Immediately after the dog has been returned to a zero position, the clock driven cam 18 allows lever 17 and gear 24 to return to the normal position to establish the driving connection between ratchet 14 and dog 12. The pointer 11 will indicate the maximum number of times relay 13 has been energized during any time interval and may thus indicate the maximum demand of an electric meter, the operation of which causes the actuaton of relay 13 for predetermined quantities of metered energy.

In the upper portion of the figure I have represented at 25 and 26 a pair of integrating type meters provided with contact closures 27 and 28 of any standard type, so constructed and arranged that the rate of closure of the contacts will be directly proportional to the rate of the meters respectively. Contactor 27 is in a circuit which contains a source of direct current represented at 29, a condenser 30 bridged by high resistance 31 and the energizing coil of the demand meter relay 13. Similarly, contactor 28 is connected in series with source 29, a second resistance shunted condenser 30' and the energizing coil of relay 13. Thus, the two contactors, together with their shunted condensers, are connected in parallel branches and in series with the source 29 and the relay 13.

I am aware that it is old to operate a single demand meter relay in accordance with the demands of two integrating type meters. Such a system is described in U. S. Patent 1,477,367 to Otto A. Knopp. However, the circuits which I have outlined above and which I will presently explain in detail, have several important advantages over the Knopp system, not only for duplex demand meter service, but for demand meter service and the operation of relays in general.

The operation of my improved arrangement will first be described as for the registration of the demand of a single meter and for this purpose the switch 32 may be assumed to be opened. When contactor 27 is closed by the rotation of meter 25, condenser 30 is charged from the source 29 and the charging current flowing through the coil of relay 13 is sufficient to operate said relay. This charging current will flow only for an instant even though the meter 25 is rotating very slowly, or should stop in a position to keep the contactor 27 closed since the condenser 30 immediately becomes charged to the full voltage of the source 29. Thus, the first advantage which may be mentioned, incident to my improved system, is in the economy of electric energy used. The saving in operating energy is not so important as the fact that the coil of relay 13 need not be designed to withstand continuous energization as is the case with previous arrangements since it is entirely possible that the meter will come to a stop with the contactor 27 closed. Since in any event, with my system, the current flowing through the coil of relay 13 is substantially instantaneous, the heating effect is nil and the coil may be designed, wound and installed without regard to the heating effect.

The second important advantage incident to my improved circuit is that any tendency for the contactor 27 to chatter in closing will cause only a single actuation of relay 13 since the charging current is substantially instantaneous and a second closing of the contactor immediately thereafter will not be accompanied by any appreciable flow of current as would be the case if the condenser were omitted.

A further important advantage is that no sparking occurs when the contactor is opened because the condenser being fully charged, no current is then flowing. Consequently the danger of sparking contacts is entirely eliminated and the contacts will never burn away and fail as is often the case with the usual arrangement.

The discharge resistance 31 which bridges the condenser is very high so that after the contactor 27 has opened the charging circuit, the condenser is discharged at a relatively slow rate through the resistance. The value of this resistance must be such that the condenser is substantially fully discharged before the next succeeding normal closure of the contactor 27 when the meter 25 is operating at its fastest rate. In certain cases it may be possible that the normal closure of contactor 27 is very rapid in which case, instead of discharging the condenser through a resistance, auxiliary meter operated contacts may be arranged to short circuit the condenser immediately after the energizing contacts have opened. The advantages which are outlined above apply even though the system be used in connection with a single meter.

Perhaps the most important use of my invention is where it is applied in connection with the operation of a single relay by two or more meter operated contacts to obtain the demand registration of a plurality of meters by a single demand meter. Assuming switch 32 to be closed, and both meters 25 and 26 operating, the operation of the relay 13 by the second circuit including contactor 28 and condenser 30' is exactly similar to that previously described, and normally relay 13 will be actuated whenever either contactor 27 or 28 is closed provided they do not close exactly simultaneously. If it should occur that contactors 27 and 28 close exactly simultaneously, both condensers 30 and 30' would be charged simultaneously and there would be only one actuation of relay 13. Thus, one actuation of relay 13 would be lost producing an error in the demand registration. The probability of this occurring is extremely small and the probable error may be disregarded. If contactor 28 should close immediately after contactor 27 and while contactor 27 is still closed, no error would be produced in the actuation of relay 13 since the charging current flowing to condenser 30 ceases to flow almost instantaneously and the armature of relay 13 is retracted by spring 22 almost instantaneously and is again attracted due to the charging current flowing to condenser 30'.

A further advantage of my arrangement is that any number of meter operated contactors provided with series condensers may be employed merely by connecting them in parallel as indicated in dotted lines in the figure, so that a single demand meter provided with a single coil notching up relay may be employed to register the simultaneous demand of any desired number of meters with a very small probability of error, the probability of error increasing however, with the number of meters so connected.

The only requirement of my energizing circuit over the standard circuits heretofore used for operating relays of the character described is that it requires direct current and the use of a condenser provided with some means for discharging the condenser. Consequently, any standard installation may be changed over to my system and converted into a multiple system, if desired, with little cost and with no change in the demand meter apparatus already installed.

I have found that for a relay coil having 8200 turns of .003 inch enamelled wire and a resistance of 1710 ohms operating on 220 volts direct current, that a condenser of 2 microfarads shunted by a resistance of 2 to 3.3 megohms gives good operation and that the voltage for this combination may be reduced to 176 volts before a failure of operation occurs. Various other combinations of values may be found for which the system will operate successfully and the data above given is merely one practicable combination.

The utility of my improved relay circuit is not limited to its use in connection with demand meters. The meter operated contactors might be operated manually or by any other agency and the relay 13 might be used to operate various other apparatus, such for example as switches or signals. The delay necessary for the condenser 30 or 30' to become discharged before the relay coil 13 can again be energized by the same circuit, might be utilized in various ways to prevent too frequent actuation of any type of device.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. In combination, a translating device, a source of direct current for operating said device and an energizing circuit between said source and device including a plurality of parallel branches each branch containing a circuit closer and a condenser connected in series, each of said condensers being of sufficient capacity to take a charging current from said source sufficient to operate said translating device and means for individually discharging each condenser when its circuit is open.

2. In combination, a demand meter of the type provided with a notching up relay, an energizing circuit for said relay including a direct current source, a condenser and a contactor, all connected in series with the operating coil of said relay, an integrating meter adapted to intermittently close said contactor in response to the measurement of predetermined amounts of a metered quantity and means for discharging said condenser when said contactor is open.

3. In combination, a demand meter of the type provided with a notching up relay, an energizing circuit for said relay including a direct current source, a condenser and a meter operated contactor, all connected in series with the operating coil of said relay, a high discharge resistance connected in shunt to said condenser, the elements of said series circuit being so proportioned and related that the charging current flowing to said condenser when the circuit is normally closed is sufficient to operate said relay.

4. In combination, a plurality of electric meters, mechanical contact members operated by said meters, a direct current source, a magnetic core having a magnetizing coil, said coil being connected to said source through said contact members in parallel and a resistance shunted capacity in series with each of said parallel connected contact members.

5. In combination, a plurality of electric meters, mechanical contactors operated by said meters, a direct current source, a relay having a single magnetizing coil, said coil being connected to said source through said contactors in parallel, whereby said relay is normally energized by the closing of any of said contactors and means in series with each of said parallel connected contactors for causing the operating current flowing therethrough to be substantially instantaneous irrespective of the duration of closure of the corresponding contactor.

In witness whereof, I have hereunto set my hand this 30th day of June, 1923.

CHESTER I. HALL.